United States Patent Office 3,536,780
Patented Oct. 27, 1970

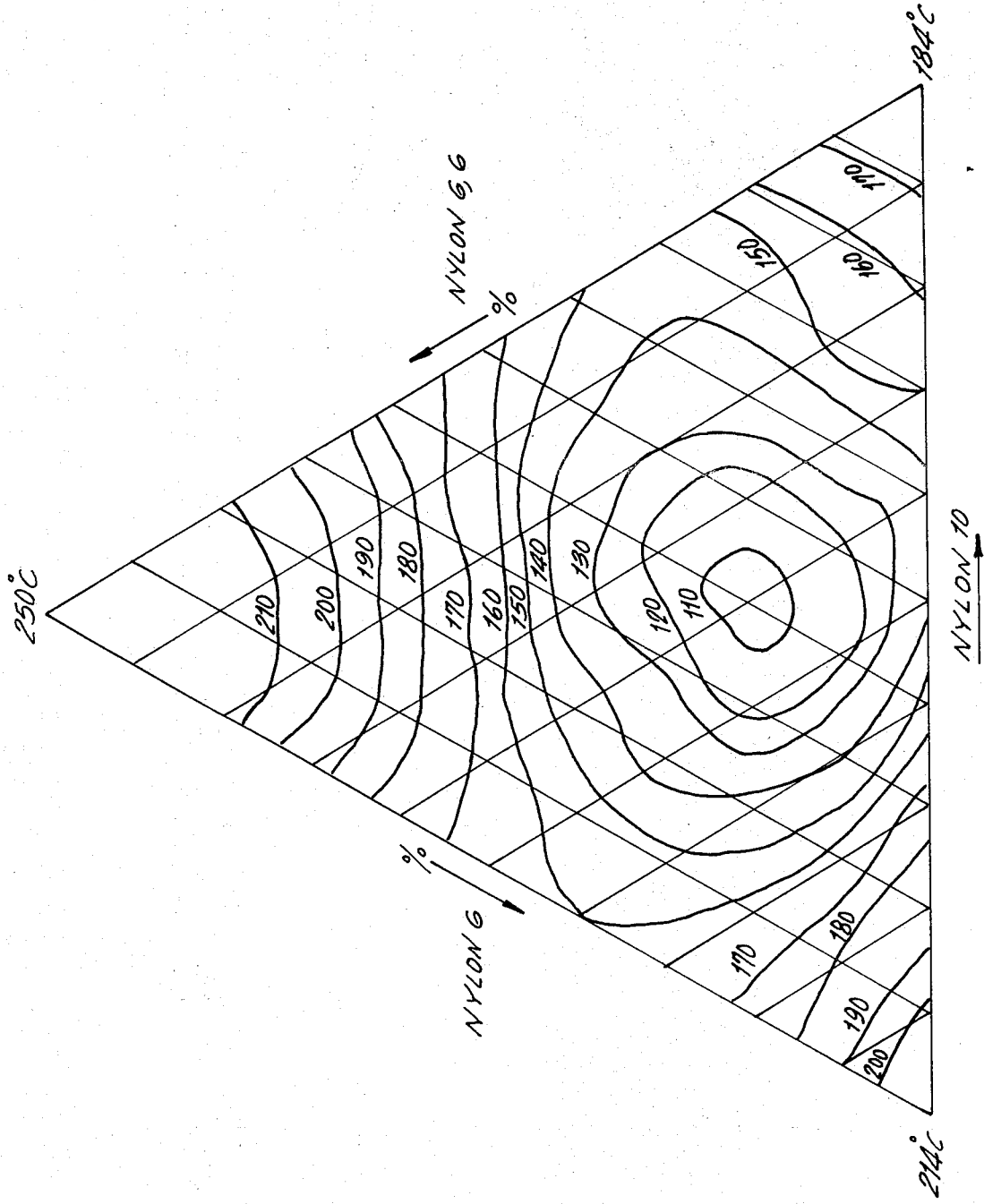

3,536,780
METHOD FOR THE PREPARATION OF TERNARY COPOLYAMIDES AND MIXED POLYAMIDES
Siegfried Schaaf, Chur, and Peter Sydney Gaut, Domat, Elms, Switzerland, assignors to Inventa A.G. fur Forschung und Patentverwertung, a corporation of Switzerland
Filed June 6, 1968, Ser. No. 735,010
Claims priority, application Switzerland, Aug. 14, 1967, 11,417/67
Int. Cl. C08g 41/04
U.S. Cl. 260—857
5 Claims

ABSTRACT OF THE DISCLOSURE

The invention relates to a method for preparing ternary copolyamides, the macromolecules of which contain, in statistical distribution, the monomer units of polyamide 6, polyamide 6,6 and polyamide 10, and to the ternary copolyamides obtained thereby. The present invention also relates to a method for preparing ternary copolyamides of the 6/6,6/12 type, and to the ternary copolyamides obtained thereby.

---

Copolyamides of the caprolactam with other polyamide-forming monomers are known in large numbers, as for example the copolyamides from caprolactam and hexamethylenediamine adipate, and from caprolactam and hexamethylenediamine sebacate, and from caprolactam, hexamethylenediamine adipate and hexamethylenediamine sebacate.

When according to the hitherto known methods (as by hydrolytic polymerization), polymerization of the monomers caprolactam, hexamethylenediamine adipate and caprinlactam, decalactam) or laurinlactam (dodecalactam) is attempted, difficulties arise. The caprinlactam or laurinlactam is quantitatively polymerizable only at temperatures starting from 290° C., while the hexamethylenediamine adipate starts to decompose at this point. Thus, according to the known methods, no homogenous ternary copolyamides of the type desired can be prepared.

It was now found that 6/6,6/10 copolyamides can be prepared in any desired proportions of the components if hexamethylenediamine adipate and caprolactam, or epsilon-aminocaproic acid as a caprolactam-forming component, in the presence of polycaprinlactam, are heated at 250° C. to 290° C. for at least 8 hours in an inert gas atmosphere. The polymerization can be carried out either without pressure or water or epsilon-aminocaproic acid can be connected in front in a closed polymerization vessel. Preferably, 10-60% by weight of caprolactam and/or epsilon-aminocaproic acid, 10-50% by weight of hexamethylenediamine adipate, and 5-70% by weight of polycaprinlactam (polydecalactam) are used.

The new method can similarly be used for preparing other ternary copolyamide types which in the macromolacule have the caprinlactam (decalactam) unit. For example, in place of caprolactam (or epsilon-aminocaproic acid) oenanthlactam or aminoundecanoic acid can be used, and hexamethylenediamine sebacate may be substuted for hexamethylenediamine adipate.

The corresponding 6/6,6/12 copolyamide can be prepared in any desired ratios of the components if the hexamethylenediamine adipate and caprolactam, or epsilon-aminocaproic acid as caprolactam-forming component, are heated without pressure at 260° to 290° C. for at least 8 hours in an inert gas atmosphere, in the presence of polylaurinlactam. Preferably, 10-60% by weight of caprolactam and/or epsilon-aminocaproic acid, 10-50% by weight of hexamethylenediamine adipate and 5-70% by weight of polylaurinlactam are used.

The time of polymerization required depends on the polymerization temperature and the concentration of the acidic chain growth propagation regulators added. If the polymerization lasts less than 8 hours at 290° C. or 10 hours at 260° C. (12 hours at 260° C. for polylaurinpolymer) incomplete statistical distribution of the monomer units in the macromolecule through the polymerization and transamidation process takes place, and the properties of the polyamides obtained are more like those of a block polymerizate. In general, polymerization times of 8-15 hours are sufficient.

The polycaprinlactam (polydecalactam) is preferably one with a melting temperature of 183-185° C. and having an average mean polymerization degree of 10 to 50, i.e. a relative viscosity of 1.3 to 1.8 (measured as 0.5% solution in m-cresol at 20° C.), prepared by known methods. The polylaurinlactam is preferably one with a melting temperature of 173-176° C. and having an average mean polymerization degree of 10 to 50, i.e. with a relative viscosity of 1.4-1.7 (measured as 0.5% solution in m-cresol at 20° C.). As inert gas, nitrogen and carbon dioxide, among others, can be used.

The process may be carried out by using polycaprinlactam or polylauric lactam in form of a melt instead of granules. The polymerization of polycaprinlactam and polylauric lactam may be carried out in the same reaction vessel which is also used for the addition of the components, according to the actual invention, after the completion of the polymerization.

The molecular weight of the ternary copolyamides can be regulated in a known manner to the extent desired by addition of chain growth regulators which block the carboxyl and/or amino groups. To that end, there may be used organic carbonic acids, preferably in an amount of 1.2-1.5 mol percent. Likewise, other chain growth regulators as are known from caprolactam polymerization may be used, such as amines, amides, alkali hydroxides and phosphoric acids.

The polycaprin copolyamides are, depending on the ratio of the monomer components, polymers whose melting point can vary from 100° C. to close to the melting points of the corresponding homopolyamides. Some of the copolyamides are soluble in 85% aqueous alcohol (water/ethanol or methanol) or in water/alcohol/benzol (or Toluol) (20:80:10 for example). Others are insoluble in the said mixtures. All these copolyamides are insoluble in aliphatic halogen hydrocarbons (e.g. perchloroethylene, trichloroethylene). That no block polymer exists is evident from the melting temperature depressions and the solubility conditions. The polylaurin copolyamides are, depending on the ratio of the monomer components, polymers which have melting temperatures in the range of 100° C. to the melting points of the homopolyamides. Only in the case of a special ratio of the components they are soluble in aqueous alcohol.

Applications of these ternary copolyamides include the fields of hot melt adhesives, for textile bonds for example, as powder, dispersion or solution, and adhesives from solution and bonding agents in metal coatings with plastics. In addition, they are suited by reason of their good solubility or miscibility through addition of suitable agents (formaldehyde, epoxy resins, phenolic resins, etc.) for the preparation of reactive (cross linkable) polyamides which are important as for metal bonds, and textile and paper coatings.

In the examples that follow, the method according to the invention is explained in greater detail. The characterization of the copolyamides 6/6,6/10 of Example 1 is given by the melting temperature triangle in FIG. 1.

EXAMPLE 1

10 kg. of a mixture of epsilon-aminocaproic acid, hexamethylenediamine adipate and polycaprinlactam (polydecalactam) were melted with the addition of 1.3 mol percent of sebacic acid as a chain growth propagation regulator under nitrogen in a 20 l. vessel. The polycaprinlactam (relative viscosity of a 0.5% solution in cresol at 20° C.:1.5) was used in the form of cylindrical granulate (3 mm. diameter and 3 mm. length). The mixture was heated to 270° C. and maintained at atmospheric pressure for 15 hours under agitation at this temperature, the separating water being removed continuously through the inert gas. The melt of the copolyamide obtained was then in the known manner removed from the polymerization vessel and granulated in a know manner.

The proportions of the reactions were varied, and the amounts and results are shown in the triangular graph of FIG. 1.

The measured melting temperature can, on the basis of the proportions of the starting products, be read off. In this diagram, equal melting temperature values are connected by isothermal lines.

EXAMPLE 2

The amounts indicated in Table I of epsilon-aminocaproic acid, hexamethylenediamine adipate and polylaurinlactam (relative viscosity of a 0.5% solution in m-cresol at 20° C.:1.6) are melted together with 1.3 mol percent sebacic acid as viscosity growth regulator under nitrogen atmosphere. The mixture is heated to 270° C. and maintained at atmospheric pressure for 15 hours with agitation at this temperature, the separating water being removed continuously through the insert gas.

The resulting ternary copolyamides then show the melting temperatures and solubilities cited in Table I.

TABLE I

| | Starting products (percent by weight) | | | Copolyamides 6/6,6/12 | |
|---|---|---|---|---|---|
| No. | Amino-caproic acid, percent | Hexamethyl-enediamine adipate, percent | Polylaurin lactam, percent | Melting temperature, °C. | Solubility at boiling temp., g./100 ml. solvent ($CH_3OH$—$H_2O$ 85:15) |
| 1 | 57 | 38 | 5 | 163–165 | >25 |
| 2 | 54 | 36 | 10 | 153–157 | >30 |
| 3 | 51 | 34 | 15 | 146–150 | >40 |
| 4 | 48 | 32 | 20 | 135–137 | >25 |
| 5 | 40 | 30 | 30 | 133–136 | >20 |
| 6 | 40 | 10 | 50 | 117–120 | <3 |
| 7 | 35 | 15 | 50 | 114–116 | <4 |
| 8 | 30 | 40 | 30 | 117–120 | >5 |
| 9 | 30 | 30 | 40 | 107–110 | >10 |
| 10 | 30 | 25 | 45 | 108–111 | >10 |
| 11 | 30 | 20 | 50 | 115–119 | <2 |
| 12 | 30 | 15 | 55 | 118–120 | <2 |
| 13 | 30 | 10 | 60 | 122–124 | <1 |
| 14 | 25 | 30 | 45 | 107–109 | >15 |
| 15 | 25 | 25 | 50 | 114–116 | >10 |
| 16 | 25 | 15 | 60 | 122–125 | <1 |
| 17 | 20 | 40 | 40 | 138–140 | >15 |
| 18 | 20 | 30 | 50 | 123–125 | <1 |
| 19 | 20 | 20 | 60 | 124–127 | <1 |
| 20 | 15 | 25 | 60 | 125–130 | <1 |
| 21 | 10 | 40 | 50 | 144–147 | <2 |
| 22 | 10 | 30 | 60 | 130–133 | <3 |

All of the enumerated ternary copolyamides are practically insoluble in boiling trichloroethylene. No. 3 gives 20% solutions in methanol/$H_2O$ (85:15) which after several months are still stable. The greater the nylon 12-proportion, the lower the solubility in aqueous alcohols. Instead of the indicated amounts in epsilon-aminocaproic acid, there can be used the equivalent amount of caprolactam with the same results.

Further tests were run to determine the textile agglutination characteristics of a ternary copolyamide (Nylon), the results being as follows:

EXAMPLE 3

(a) Component ratio: Nylon 6/6,6/12 (35:25:40 weight percent).

Ground powder: 0.2–0.5 mm. granule size.
Melting temperature range: 110–120° C.
Relative viscosity (in cresol): 1,4.
Glueable with "Hot Steam Ironing Press."
Stability vis-a-vis perchlorethylen and trichlorethylen.
Melting viscosity with a load of 2.16 kg. and at 160° C.: 15,000±1000 poises.
Application of the powder by means of a Saladin machine onto the material (textiles).
Hot steam ironing and measuring of the separation firmness of the material glued to one another on 2.5 cm. wide strips.

| | Applied amount, g./m.² | Peel strength after ironing, g. | Peel strength after 20× chemical cleaning (perchlorethylen), g. |
|---|---|---|---|
| Cotton–cotton | 40 | (¹) | (¹) |
| Do | 10 | 2,300 | 1,830 |
| Wool–cotton | 30 | (¹) | (¹) |
| Do | 10 | 3,400 | 2,560 |
| Polyester–cotton | 30 | 4,450 | (¹) |
| Do | 10 | 1,850 | 1,220 |
| Acetate silk–cotton | 30 | 2,500 | 3,180 |
| Do | 10 | 900 | 715 |

¹ Inseparable.

From the foregoing data it is clear that these products are useful as adhesives for textiles by the so-called Plastipoint-Process. The composition set forth herein is good for affixing facing materials to cloth.

What is claimed is:

1. A method for the preparation of ternary copolyamides comprising introducing as reactants 10–50% by weight of hexamethylene diamine adipate, 10–60% by weight of a compound taken from the class consisting of caprolactam, epsilonaminocaproic acid, and mixtures thereof; and 5–70% by weight of a substance taken from the class consisting of polycaprinlactam and polylaurylactam, said substance having a relative viscosity of at least 1.3 as measured as 0.5% solution in m-cresol at 20° C. heating said reactants to a temperature of 250° to 290° C., maintaining said temperature for at least eight hours.

2. Method according to claim 1 characterized in that said heating takes place from 8 to 15 hours.

3. Method according to claim 1 characterized in that said polycaprinlactam preferably has a relative viscosity of 1.3 to 1.9, measured as 0.5% solution in m-cresol at 20° C.

4. Method according to claim 1 characterized in that chain growth propagation regulators, such as organic carbonic acids, organic amines or phosphoric acid, are added.

5. A method according to claim 1 wherein said polylaurinlactam has a relative viscosity of 1.4 to 1.7 measured as a 0.5% solution in m-cresol at 20° C.

References Cited

FOREIGN PATENTS 296,097    5/1965    Netherlands.
6,509,284  1/1966    Netherlands.

OTHER REFERENCES

German 1,253,499 as cited in Chemical Abstracts 68 3387W (1968), published Nov. 2, 1967.

PAUL LIEBERMAN, Primary Examiner

U.S. Cl X.R.

260—78, 830, 841; 161—184, 190